Oct. 27, 1936.   A. A. THOMAS   2,058,530
LIFTING MEANS AND SIDEWARD DRIVING MECHANISM FOR AUTOMOBILES
Filed Aug. 8, 1930   4 Sheets-Sheet 2
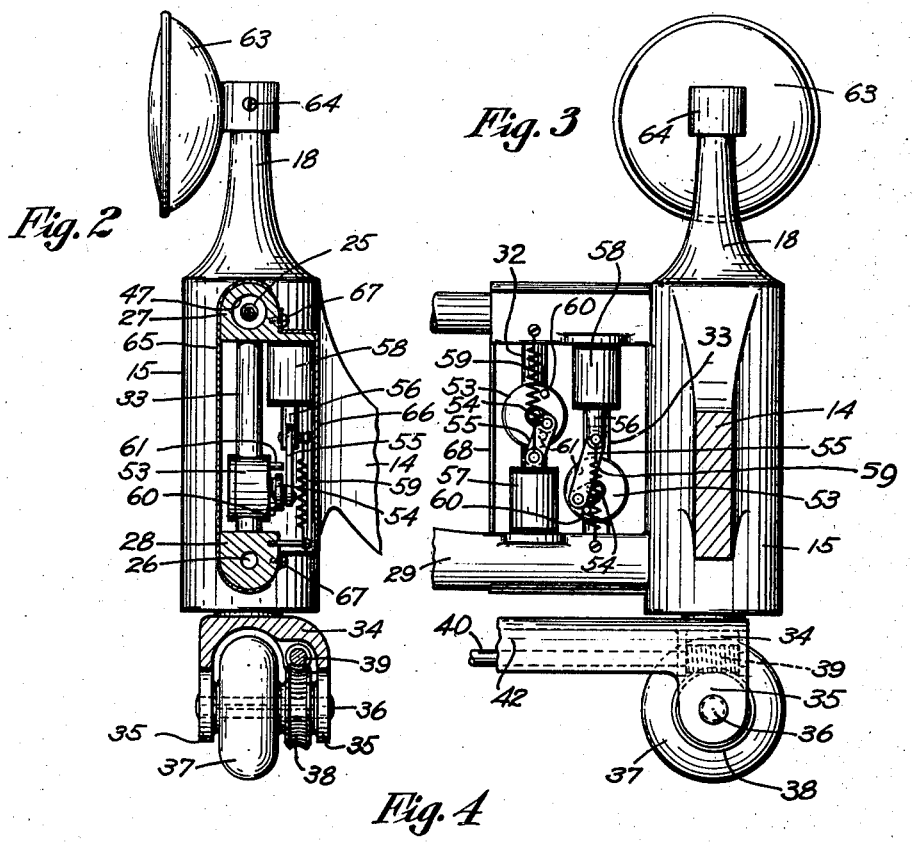
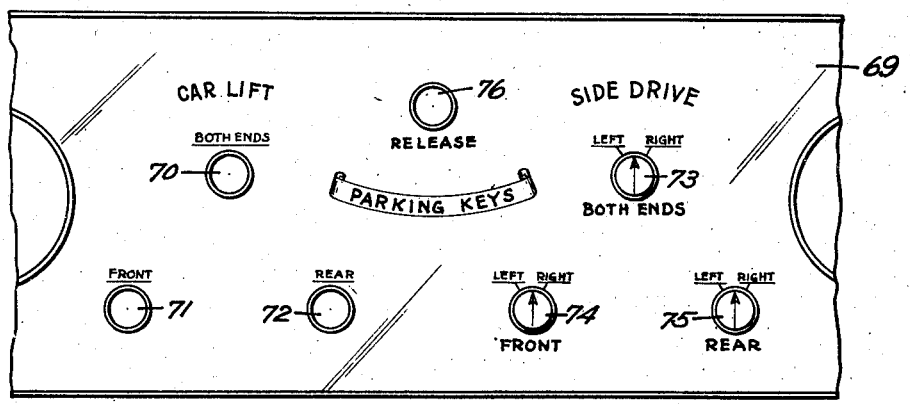
INVENTOR
Adolph A. Thomas

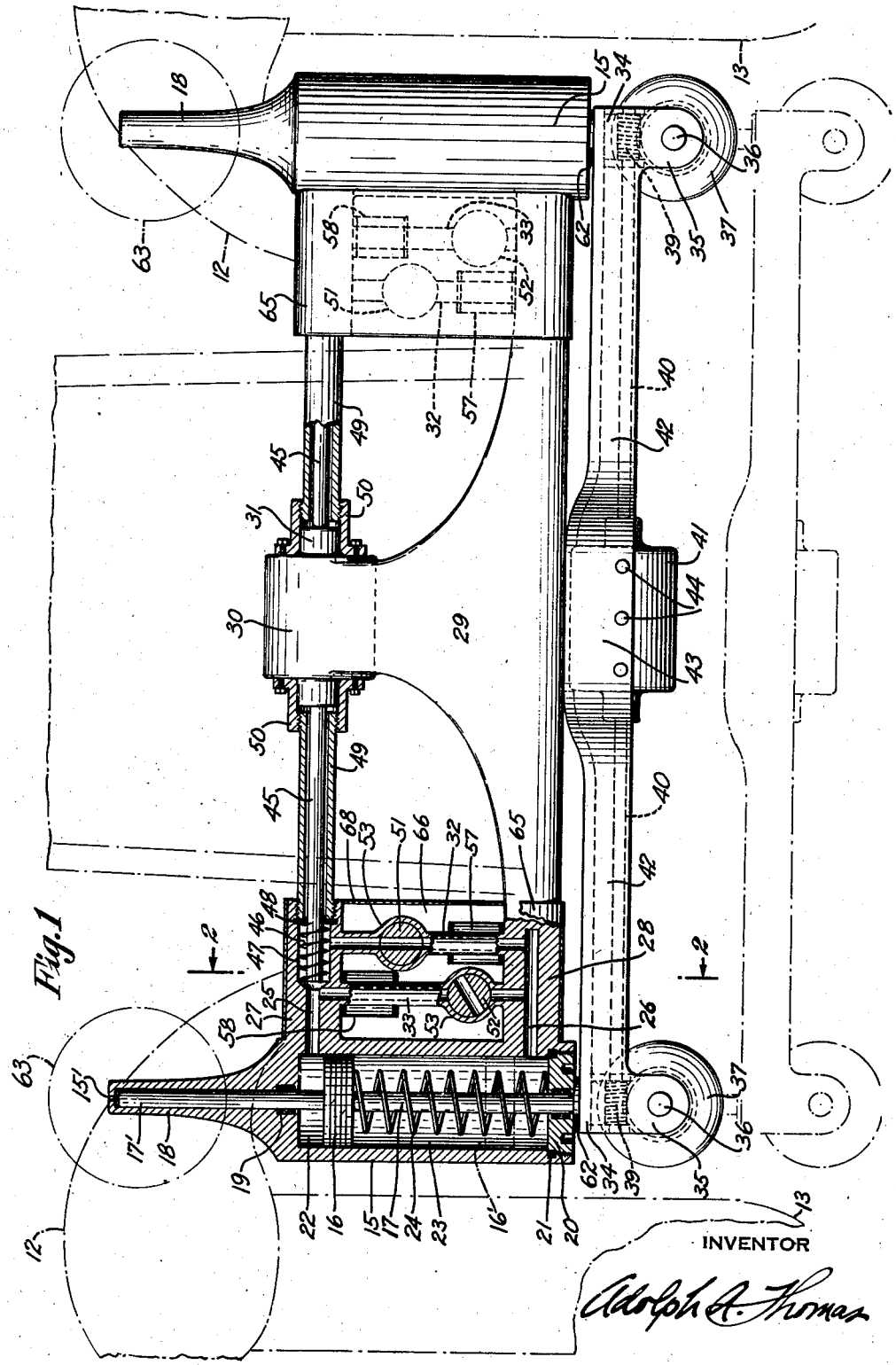

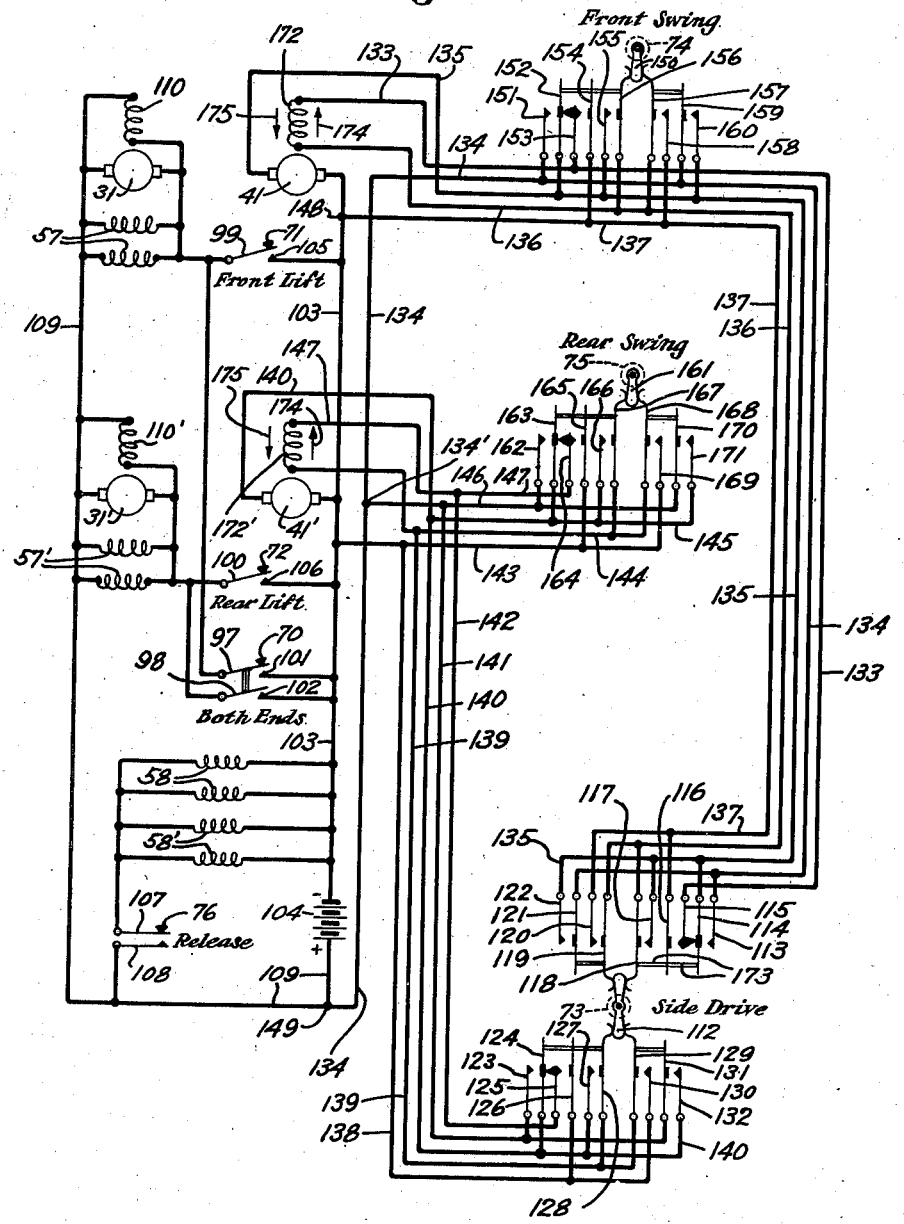

Oct. 27, 1936.                A. A. THOMAS                2,058,530
         LIFTING MEANS AND SIDEWARD DRIVING MECHANISM FOR AUTOMOBILES
                          Filed Aug. 8, 1930            4 Sheets-Sheet 4
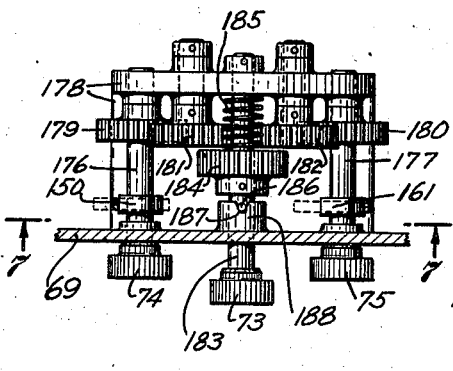
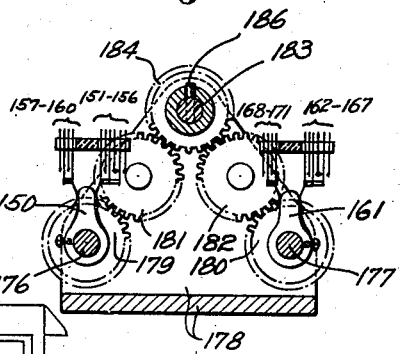
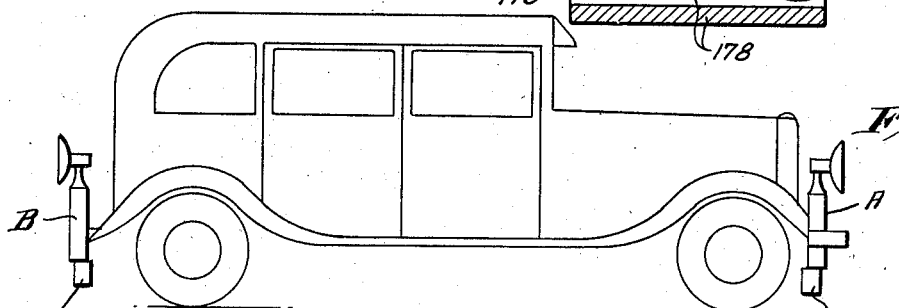
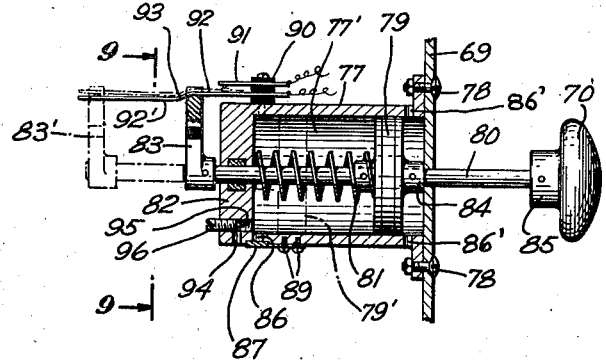
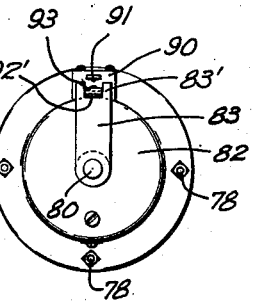
INVENTOR Patented Oct. 27, 1936

2,058,530

UNITED STATES PATENT OFFICE 2,058,530

LIFTING MEANS AND SIDEWARD DRIVING MECHANISM FOR AUTOMOBILES

Adolph A. Thomas, New York, N. Y.

Application August 8, 1930, Serial No. 473,882

28 Claims. (Cl. 180—1)

This invention is for new and improved mechanism adapted to be mounted on automobiles, trucks, buses and other self-propelled vehicles for lifting the vehicle off its running wheels and moving it sideward in either direction. My novel parking mechanism is characterized by simplicity and compactness of structure, so that it can be installed on any make or type of automobile. In a preferred form of my invention I employ two similar hydraulic units of flat construction attached crosswise to the ends of a car, and no part of the mechanism need be beneath the chassis. Furthermore, the mechanism is entirely disconnected from the automobile engine, and is controlled by keys or push buttons on the instrument board. The lifting parts of my new mechanism may also be used independently of the other features of my invention.

Briefly stated, my new parking device comprises four upright cylinders rigidly mounted at the corners of the chassis. The two cylinders at each end of the vehicle are connected by a crossframe and constitute a unitary hydraulic assembly. The pistons of each pair of cylinders are connected by a bracket which also carries an electric motor arranged centrally between the pistons. The driving shaft of the motor extends in opposite directions toward each cylinder. Each piston supports at its lower end a small parking wheel, which is permanently geared to one end of the motor shaft. In other words, the electric motor at each end of the car is bodily movable with the connected pistons and parking wheels. The cylinders are closed at the bottom and constitute oil reservoirs from which oil is pumped into the space above the pistons for raising the car off its running wheels. The pumping operation is effected by another pair of electric motors mounted between the cylinders at each end of the car. To lower the automobile, a valve associated with each cylinder is opened by means of a push button to discharge the oil from above the pistons into the space below them. This arrangement dispenses with a separate oil tank and does not require any part of the mechanism to be mounted beneath the body of the car. Another feature of my invention resides in the fact that both ends of the car can be raised simultaneously, or either end alone. This permits sideward movement of the entire vehicle or a swinging movement of either end alone to the right or left. All these various operations are controlled by push buttons or knobs within easy reach of the driver.

The novel features and practical advantages of my invention will be understood from a description of the accompanying drawings, in which—

Fig. 1 shows a front elevation of one of the parking units mounted on the car, certain parts being sectioned for clearness;

Fig. 2 is a vertical section on line 2—2 of Fig. 1;

Fig. 3 represents a rear view of a portion of the mechanism shown in Fig. 1;

Fig. 4 illustrates an arrangement of buttons and knobs on the instrument board of the car for controlling the parking mechanism;

Fig. 5 is a diagram of circuit connections controlled by the finger pieces in Fig. 4;

Fig. 6 shows a top view of a modified arrangement of three parking knobs or keys adapted to be connected for simultaneous operation;

Fig. 7 is a section on line 7—7 of Fig. 6;

Fig. 8 shows a sectional view of a timed switch for the car-lifting and releasing buttons on the panel of Fig. 4;

Fig. 9 is a rear end view of Fig. 8 on line 9—9; and

Fig. 10 is a diagrammatic view showing a car provided at each end with my new parking or lifting unit.

Since the parking units A and B mounted at the ends of the automobile are alike in structure and operation, a detailed description of one unit is enough for both. It will therefore be understood that the parking unit shown in Fig. 1 may be regarded as either the front or the rear unit, which is secured to the chassis in any practical way. I have not considered it necessary to show any structural parts of an automobile, except to indicate in dotted outlines the engine hood 10, fenders 12 and running wheels 13. This is sufficient to show the general relation between the parking units and the car on which they are mounted. It is preferable to secure these units to the side channel bars of the chassis, as by means of brackets 14 projecting from the hydraulic cylinders 15. The brackets 14, which may be cast integral with the cylinders, are bolted at their inner ends to the chassis at convenient points, depending upon the particular design of chassis. This will be understood without additional illustration. One way of attaching the brackets 14 to the car is shown in my copending application Serial Number 472,631, but I want it understood that my invention is not limited to any specific means for securing the parking units to the car, nor to any particular points of attachment on the car structure. The front parking unit is positioned in the space between the radiator and the bumper, preferably only a few inches from the radiator. If the unit is secured to the chassis extensions which project on either side of the radiator on all cars, no part of the unit will be underneath the body of the car, because the parking unit is a flat vertical structure. In each vertical cylinder 15 operates a piston 16 in an oil-tight fit, like the pistons of a gas engine. The piston 16 is fixed on a rod or stem 17 which projects axially on both sides of the piston head, and for distinction I shall designate the upper section of the piston rod by the reference character 17'. The cylinder 15 is formed with an integral extension 18 having an axial bore to receive the section rod 17' in a slidable fit. A suitable gland packing 19 may be used, if necessary, to prevent oil from entering the extension 18 during the pumping operation. The lower section of piston rod 17 passes through the bottom disk 20 of cylinder 15 in an oil-tight fit, and this disk is screwed into place against a compressible gasket 21 to make an airtight joint.

The piston 16 divides the cylinder 15 into an upper chamber 22 and a lower chamber 23, in which an expanding coil spring 24 is located for normally holding the piston and all connected parts in elevated position. The chambers 22 and 23 communicate, respectively, with passages 25 and 26 formed in lateral extensions 27 and 28 of the cylinder. These lateral extensions are parts of a cross-frame 29 which terminates at the center in a bracket 30 adapted to support an electric motor 31. The bracket 30 may be an integral part of frame 29 or attached thereto as a separate piece. Each pair of lateral extensions 27—28 is connected by two vertical pipes 32—33 for conveying oil from one cylinder chamber to the other, as will presently be explained. The frame 29, bracket 30, both cylinders 15, the four lateral extensions 27—28, and the four vertical pipes 32—33, may all be integral parts of a single casting of duralumin or other light strong metal. This casting would be counterbored and plugged wherever necessary to provide for the drilling of members 27, 28, 32 and 33, as will be understood by metal-casting experts. If the oil pipes 32—33 are separate pieces screwed into the side arms 27—28, at least one of the latter must be separate from cylinder 15. It is immaterial how the various parts of the unitary structure above described are constructed and assembled, provided they perform their intended function.

Each piston rod 17 carries at its lower end a bifurcated block 34 having downward extensions 35 adapted to support a shaft 36 on which a small wheel 37 is rotatably mounted. For convenience I shall refer to 37 as the parking wheels, because they move the car sideways into and out of parking position. At one side of each parking wheel is a small worm wheel or spiral gear 38 arranged in permanent mesh with a worm or spiral pinion 39 on a transverse shaft 40, which is operated in either direction by a reversible electric motor 41. These gear connections are such that the motor shaft 40 drives the wheels 37 in the same direction, right or left, at the same speed. Each wheel 37 and its adjacent gear member 38 may be a single casting of duralumin or other suitable metal. The bearing blocks 34 carried by each pair of piston rods 17 are preferably integral end parts of a cross-beam or channel bar 42, which bulges at the center to form a housing or bracket-like enlargement 43. The motor 41 is secured in the housing or enlargement 43 by bolts 44 or otherwise. All four motors 31 and 41, as well as the gear connections 38—39, may be entirely enclosed to render them invisible and weatherproof. For distinction I shall call 31 the lifting motors, because they pump oil into chambers 22 to raise the car, and the motors 41 are the parking motors, because their function is to move the car sideways on wheels 37 into and out of parking position.

The lifting motors 31 are each provided with a driving shaft 45 which carries at each end a screw-blade or spiral propeller 46 arranged to operate in an aperture 47 of lateral arm 27 for pumping oil from the lower cylinder chamber 23 through pipe 32 into the upper chamber 22. The aperture 47, which is really an enlarged mouth or inlet for passage 27, is closed at the outer end by an oil-tight bushing 48 or otherwise. The motor shaft 45 is preferably concealed in tubes 49, which are screwed at their outer ends into the aligned arms 27. The inner ends of tubes 49 are screwed into bushings 50 which are secured to the opposite sides of motor housing 30. The vertical pipes 32 and 33 have each a valve 51 and 52, respectively, of any practical structure. By way of simple illustration, I have shown each valve in the form of a rotary disk mounted in a cylindrical housing 53 and having a diametric passage adapted to be brought into and out of register with the associated pipe. Each valve has a crank arm 54 pivotally connected to a link 55 which carries a magnetic core 56 arranged to move into and out of a fixed solenoid coil. The coils associated with valves 51 are indicated by numeral 57, and the coils for valves 52 are marked 58. A contracting coil spring 59 normally holds each crank arm 54 against a fixed stop 60, so that the associated valve 51 or 52 is closed (like valve 52 in Fig. 1). When the solenoid of a valve is energized, the valve is moved to open position (like valve 51 in Fig. 1) until the crank arm 54 encounters a second fixed stop 61.

In the normal position of the movable parts as shown in Fig. 1, the expanding coil springs 24 hold the pistons 16 and all connected parts in uppermost position, so that the parking wheels 37 are off the ground several inches. If the vertically movable framework connected with pistons 16 is made of light metal (except the magnetic parts of motor 41), the weight normally supported by springs 24 is only a few pounds. These springs, however, should be sufficiently strong to hold the cross-bar 42 firmly against the underside of cylinders 15 and prevent rattling of the parts during the normal running of the car. If desired, a washer 62 of non-metallic material may be interposed between the ends of bar 42 and the bottom disks 20 of the cylinders. The cylinder chambers 22 and 23, and the connecting passages 26, 27, 32 and 33 are filled with oil or other suitable liquid, so that the pressures on opposite sides of piston 15 are substantially equal. Since the valves 51—52 are normally closed, the opposing oil pressures lock the pistons 16 against movement and thereby assist the springs 24 to maintain the parking wheels 37 firmly in raised position.

Still referring to Fig. 1, let us suppose that the motor 31 is energized and that the valves 51 are open. The rapidly moving spirals 46 pump oil simultaneously and at the same rate out of cylinder chambers 23 through pipe connections 26, 32, 47 and 25 into the upper chambers 22. Consequently, the pistons 16 descend until the wheels 37 touch the ground. The continued pumping of oil into chambers 22 lifts the cylinders 15 and therefore the car, until the pistons 16 are in position 16' near the lower end of the cylinders. The car is now raised off the ground (a few inches will do) and supported on the parking wheels 37. If both lifting motors 31 are energized, the car is raised at both ends, but either motor can be operated without the other, as I shall presently explain. When the car is in elevated position, the circuit of motor 31 is opened, either automatically or by manually releasing a switch member. If the operator now desires to move the car sideways on wheels 37, he closes the circuit of motor 41 which slowly rotates the wheels 37 right or left, as required. When the car has moved far enough, the operator simply lets go of the actuated finger piece and the parking motor 41 stops. It is hardly necessary to mention the obvious fact that the outward stroke of the pistons 16 in lifting the car off its running wheels is sufficient to take care of any sag of the axles. This sag will be very small, especially on automobiles having semi-elliptical springs, and that means nearly all makes of passenger cars. Furthermore, the suspension springs on automobiles are usually provided with snubbers or shackles to limit the downward movements of the springs.

To lower the raised car, it is only necessary to open valves 52, while valves 51 are closed, whereupon the weight of the raised car forces the oil out of chambers 22 through connections 25, 33 and 26 back into chambers 23. When the car is again on its running wheels, the upward pressure of springs 24 pushes the pistons 16 slowly upward (the valves 52 being still open) until the parts reach their normal position. Since the piston rods 17 are always in closely fitting contact with cylinders 15 at both ends, the car is firmly supported in raised position. The cylinder extensions 18 have each an air vent 15' to permit free movement of the piston rods, and those extensions may also be used as supports for headlights 63, which enhance the appearance of the parking mechanism. The lamps may be secured by collars 64 or in any other practical way. The pipes 32—33 and valves 51—52, together with the associated solenoids, may be concealed by plates 65 and 66 mounted on the lateral arms 27—28. The rear plates are secured by screws 67 and have a forwardly extending side 68 which abuts against the adjacent front plate 65 and thus forms a closed dust-proof casing. The front plates 65 are preferably ornamental and may be of spring metal adapted to snap over the rounded arms 27—28 in firm engagement, as shown in Fig. 2.

Attention is called to the great amplification of power between the oil-pumping shaft 45 and the hydraulic lifting chambers 22. There are two factors which contribute to this gain in force: first, the feed screws 46 are turned by a lever represented in this instance by the rotating armature of motor 31; secondly, the applied force in passage 25 and the resisting force in chambers 22 (i. e. the weight to be sustained) are proportional to their cross-sectional areas. Suppose the inside diameter of cylinders 15 is 5.5 inches and the diameter of inlet passage 25 is 0.5 inch. This gives an area ratio of something over 120:1, which means that every pound pressure in passage 25 is capable of sustaining a weight of 120 lbs. in chamber 22. If we have a car with a maximum weight of 6000 lbs., each column of oil in chambers 22 carries 1500 lbs., but it requires only a force of 12.5 lbs. in the inlet passage 25 to counterbalance that pressure.

In other words, the screw blades 46 at each end of shaft 31 should exert a pressure (theoretically) of a little over 12.5 lbs. to force the oil into chamber 22 against the resisting weight of the car. Now, the force required to turn the screws 46 for moving a weight of 12.5 lbs. is proportional to the product of the load and the pitch of the screw divided by the circumference of the circle through which the applied force acts. If the screws 46 have a pitch of 0.25 inch and the armature of motor 31 acts through a radius of three inches, it takes less than a force of one pound to rotate the armature for pumping oil into the associated pair of cylinder chambers 22. It is understood that these calculations are theoretical and take no account of friction; but even allowing for that, it is clear that only a small lifting motor consuming little electric energy is needed at each end of the car to lift the same on the parking wheels 37. Furthermore, the movement of oil out of chambers 23 tends to create an underpressure which pulls down the piston 16, thereby assisting the pumping operation of motor 31. In the broader aspect of my invention, I may provide a single oil reservoir for all lifting cylinders, in which case the lower chamber 23 would be open to the air.

The above described operations of lifting the car and then moving it sideways on wheels 37 are controlled by push buttons and knobs or other suitable finger pieces arranged on the instrument panel 69, as shown in Fig. 4. The three push buttons 70, 71 and 72 are for lifting the car at both ends, at the front end only, and at the rear end only. This means that when button 70 is pushed in, both lifting motors 31 are energized; while button 71 operates only the front lifting motor, and button 72 only the rear motor. Whichever one of these buttons is pressed, the solenoids of valves 51 are energized to open the valves and place the reservoir chambers 23 into communication with the hydraulic chambers 22. The three rotary knobs 73, 74 and 75 close the circuits of the reversible parking motors 41 in one direction or the other. That is, if the knob is turned right, the car moves sideways in the same direction; if the knob is turned left, the car moves left. The rotary knob 73 controls a swit h that energizes both parking motors 41, while the knobs 74 and 75 operate only the front motor and the rear motor, respectively. The release key or button 76 is operated when the raised car is to be lowered back on its running wheels. For this purpose, the release key 76 energizes the solenoids of valves 52 which are thereby opened to allow the return of oil from the upper chambers 22 to the lower chambers 23. The key 76 is supposed to be held in until the parking wheels 37 are in normal raised position. While the operator sitting in the driver's seat can not see the wheels 37, experience soon enables him to know when to let go of the release key. I may, however, provide the release button with a timed switch, as I am about to describe. When I speak of the control members 70—75 as finger pieces, I do not mean that they must always be arranged for manipulation by the fingers, for it is obvious that they may be so placed as to be operated by the feet of the driver. At least, such an arrangement is easily possible for the push buttons 70, 71 and 72, which control the lifting of the car.

The lifting buttons 70, 71 and 72 control timed switch mechanism for automatically opening the circuit of motors 31 when the car is in fully raised position. One form of such mechanism is shown in Figs. 8–9, which are applicable to all the lifting buttons and the release button. A small cylinder 77 is attached to the rear side of panel 69 by bolts 78, or otherwise, and a piston 79 moves in the cylinder with a substantially airtight fit. The piston 79 is fixed on a rod 80 which carries at its outer end the push button 70, 71 or 72. An expanding coil spring 81 is arranged in cylinder 77 on rod 80 between piston 79 and the rear end 82 of the cylinder. The rear end of rod 80 carries an insulating arm 83 arranged to operate certain switch contacts. The hub 84 of piston 79 constitutes a stop to limit the forward movement of rod 80 under the expanding action of tensioned spring 81. The button 70 (71 or 72) is pushed in until the hub 85 thereof strikes the supporting panel 69, and when that happens the piston 79 is in dotted position 79'. The cylinder 77 has an air outlet 86 normally closed by a valve 87, which may simply be a small flexible disk 88 of leather or the like attached by screws 89. In other words, the member 88 is a flap-valve which is forced open by the compressed air when the piston 79 is pushed in, and which automatically closes airtight during the return stroke of the piston. The cylinder 77 supports an insulating block 90 which carries a pair of switch contacts 91 and 92. The switch member 91 may be a short stiff blade or a rigid contact piece, but the other member 92 is a long spring finger engaged by the insulating arm 83 on piston rod 80. The arm 83 may have a recessed or bifurcated end 83' for receiving the contact finger 92 in a snug fit. This arrangement holds the two parts together by preventing rotary displacement of arm 83, while permitting axial movement thereof. The contact finger 92 has an off-set or cam shoulder 93, so that the outer section 92' of the finger is laterally displaced in relation to the inner section. The rear end 82 of cylinder 77 has a pair of small holes 94 and 95 which meet at right angles. The axial hole 95 is screwthreaded to receive a pointed set screw 96 which is adjustable to vary the inlet area of air vent 94 in microscopic gradations. The front end of cylinder 77 has one or more vents 86' which are always open to the outer air.

The switch members 91—92 are normally open, due to the inherent set or tension of spring finger 92. The coil spring 81 in cylinder 77 normally holds the arm 83 out of engagement with the off-set extension 92' of contact finger 92. When the button 70 (71 or 72) is pushed in as far as it will go, the arm 83 rides under the cam extension 92' and lifts the finger 92 into pressure engagement with contact 91 to close the circuit of one or both motors 31. The motor circuit remains closed from the moment the arm 83 passes over the off-set 93 into engagement with extension 92' until the arm returns to normal position. The movement of arm 83 from normal to its farthest position 83' takes only a second or less, but the return movement is very slow, because no air can get into cylinder chamber 77' except through the tiny inlet 94 at the point of needle valve 96. By adjusting this valve, the rate of flow of air into chamber 77' can be so controlled that a predetermined interval of time is required for the return movement of piston 79. In other words, the length of time during which the motor switch 91—92 remains closed when the button 70 (71 or 72) is pushed in, can be regulated to a second. This interval will naturally vary for cars of different weights, and will have to be determined in each case by actual tests, which any expert mechanic can carry out. The point to have in mind is that the time in which the motor switch 91—92 remains closed, corresponds to the time it takes for the lifting motors 31 to raise the car, and that interval is usually less than sixty seconds. This automatic stopping of motors 31 relieves the operator of paying attention to buttons 70, 71 and 72 after pushing them in. By providing separate keys or knobs 73, 74 and 75 for the sideward movement of the car, the lifting and parking operations are separately controlled, so that the car can be retained in raised position, as long as desired. This would be necessary, for instance, in changing tires or making certain repairs underneath. In a simplified form of my invention, the parking mechanism may be omitted and the device used as an hydraulic jack operated by an electric motor and manually controlled to lift either end of the car to which the device is attached.

The circuit connections controlled by buttons 70—72 and keys 73—75 are shown diagrammatically in Fig. 5, which I shall now describe. In this drawing the front and rear lifting motors are indicated by 31 and 31', and the front and rear parking motors are designated by 41 and 41' for distinction. The solenoid coils of the two front valves 51 and 52 are marked 57 and 58, and the coils for the corresponding rear valves are indicated by 57' and 58' respectively. The timed lifting switches 91—92 have been omitted from the diagram of Fig. 5 for simplicity and replaced by spring arms 97—98, 99 and 100, which are normally open and moved to closed position by the push buttons 70, 71 and 72 respectively. The button 70 controls the two insulated switch arms 97—98 which operate as one member to engage a pair of contacts 101—102 connected to the negative lead 103 of battery 104. The source of electric power may be either a storage battery or a generator driven by the engine shaft. The switch arms 99 and 100 of buttons 71 and 72 are arranged to engage the associated contacts 105 and 106, which are connected to battery lead 103. The switch controlled by the release button 76 is represented by a movable arm 107 and contact 108. The switch arm 107, which may be a spring blade normally in open position by inherent tension, is connected to one side of the four solenoid coils 58—58' which are connected in parallel to conductor 103. The contact 108 is connected to the positive battery lead 109, so that the closing of switch 107—108 energizes all four coils 58—58' simultaneously to open the return valves 52 and thereby lower the car. The switch 107—108 is preferably held closed automatically by a time switch like that shown in Figs. 8–9, so that the solenoid coils 58—58' are kept energized to hold valves 52 open until the pistons 16 have reached uppermost position.

The switch arm 99 of lifting button 71 is connected to one side of coils 57 and the front motor 31, which is here shown as a shunt motor with a field coil 110. The switch arm 100 of lifting button 72 is connected to one side of coils 57' and the rear motor 31', whose shunt field coil is indicated at 110'. The battery lead 109 is a common conductor for one side of the four solenoid coils 57—57' and 58—58', and for the two lifting motors 31—31'. Since the lifting motors 31—31' always run in the same direction, they need not be reversible and may be series wound or of any other practical type. It is clear from Fig. 5 that when the button 70 is pushed in, the switch arms 97—98 close the circuit through the lifting motors 31—31' and the four solenoid coils 57—57' in parallel. Consequently, the valves 51 are opened to connect the oil reservoirs 23 with the hydraulic chambers 22, and the car is raised simultaneously at both ends until the motor circuit is interrupted by the timed switch 91—92, as previously described. When the button 71 is operated, the battery circuit is closed through the front lifting motor 31 and the two solenoid coils 57 which open the front valves 51, so that only the front end of the car is raised. Similarly, the operation of button 72 energizes the rear lifting motor 31' and the solenoid coils 57' which open the rear valves 51', whereby only the rear end of the car is raised.

We now come to the control of the reversible parking motors 41—41' by the rotary keys or knobs 73, 74 and 75. The "Side drive" key 73 operates an insulating arm 112 which controls two reversing switches. Any kind of reversing switch may be used, and for purposes of illustration I have diagrammatically represented each switch as consisting of ten spring fingers, which are numbered consecutively from 113 to 122 for one switch and from 123 to 132 for the other switch. The ten contact fingers 113 to 122 are connected to five conductors marked 133 to 137, and the other ten contact fingers 123 to 132 are connected to five conductors marked 138 to 142, which lead to five wires numbered respectively 143 to 147. Conductor 137 is connected to the negative battery main 103 at point 148, and conductor 134 is connected to the positive main 109 at point 149. The branch wires 143 and 146 are connected, respectively, to battery lead 103 and conductor 134. The "Front swing" key 74 operates an insulating arm 150 adapted to control a reversing switch represented diagrammatically by ten contact fingers numbered consecutively from 151 to 160, which are connected to the five conductors 133—137. The "Rear swing" key 75 has an insulating arm 161 for operating a switch device comprising ten contacts marked consecutively from 162 to 171, which are connected to the five branch wires 143—147.

The parking motors 41 and 41' are of the reversible type, which in this instance is represented by a D. C. shunt-wound motor, and the field coils are diagrammatically indicated at 172 and 172'. The armature winding of each motor is connected at one side to the negative main 103, and the other terminals of those windings are connected to conductors 135 and 140 respectively. The field winding 172 is connected to conductors 133 and 136, while the field winding 172' is connected to branch wires 144 and 147. The three switch arms 114—116—118 are mechanically connected for simultaneous operation by one or two insulating pins 173, and the two switch arms 119—121 are similarly connected. These insulated mechanical connections also apply to switch arms 124—126—128 and 129—131 of key 73, switch arms 152—154—156 and 157—159 of key 74, and switch arms 163—165—167 and 168—170 of key 75. The following pairs of switch arms are normally closed: 114—115 and 124—125 of key 73, switch 152—153 of key 74, and switch 163—164 of key 75. The other pairs of switch arms are normally open, due to their inherent set or tension. The two pairs of spring fingers 118—119 and 128—129 are provided with extensions which press against the opposite sides of arm 112 at each end thereof, whereby the key 73 is self-restoring and is normally held in neutral position. The spring fingers 156—157 of key 74 have extensions arranged to engage the actuating arm 150, and a similar connection exists between the operating member 161 of key 75 and the associated pair of spring fingers 167—168. These spring connections make the keys 74 and 75 self-restoring, as explained for key 73.

Let us suppose that the "Side drive" key 73 is turned clockwise to move the raised car sideward toward the right. This closes the switches 113—114, 115—116, 117—118, 123—124, 125—126 and 127—128, and at the same time opens the normally closed switches 114—115 and 124—125. The armature circuit of the front parking motor 41 is closed as follows: from the positive battery lead 109, conductor 134, closed switch 113—114, conductor 135, through the armature winding of motor 41, and from there to the negative side 103 of battery 104. The shunt field circuit of motor 41 is closed through positive main 109, conductor 134, closed switch 113—114, conductor 135, closed switch 117—118, conductor 136, through field coil 172 in the direction of arrow 174, conductor 133, closed switch 115—116, conductor 137 to point 148, and through the negative main 103 back to the battery. At the same time, the rear parking motor 41' is energized through the following circuit connections: positive lead 109, conductors 134 and 141, closed switch 123—124, conductor 140, through the armature winding of motor 41' and back to the battery through conductor 103. The field circuit of motor 41' is closed through positive lead 109, conductors 134 and 141, closed switch 123—124, conductor 140, closed switch 127—128, conductor 138, through field winding 172' in the direction of arrow 174, conductors 147 and 142, closed switch 125—126, conductor 138, and to the negative side 103 of battery 104.

When the "Side drive" key 73 is turned to the left (i. e. counterclockwise) to propel the raised car sideward to the left, the parking motors 41—41' operate in the reverse direction, and this reversal is obtained by sending the current through the field windings 172—172' in the direction of arrow 175, without reversing the armature current. The front motor 41 is energized through these connections: positive lead 109, conductor 134, closed switch 121—122, conductor 135, through the armature winding of motor 41, and to the return side of the battery. The field circuit of motor 41 is closed through positive lead 109, conductor 134, closed switch 121—122, conductor 135, closed switch 114—115, conductor 133, through field winding 172 in the direction of arrow 175, conductor 136, closed switch 119—120, and through conductor 137 to the return lead 103. The rear parking motor 41' is energized through positive lead 109, conductor 134 to point 134', branch wire 146, conductor 141, closed switch 131—132, conductor 140, through the armature winding of motor 41', and to the negative lead 103. The field circuit of motor 41' is closed through positive lead 109, conductor 134 to point 134', branch wire 146, conductor 141, closed switch 131—132, conductor 140, closed switch 124—125, conductor 142, branch wire 147, through field coil 172' in the direction of arrow 175, conductor 139, closed switch 129—130, conductor 138, and thence to the return main 103. It has been assumed that when the current passes through the field windings 172 and 172' in the direction of arrow 174, the car is moved sideward on wheels 37 in the direction of the driver's right, and the car is propelled in the opposite direction when the current flows through the field windings in the direction of arrow 175.

When the "Front swing" key 74 is turned to the right, only the front motor 41 is energized as follows: positive main 109, conductor 134, closed switch 151—152, conductor 135, through the armature winding of motor 41, and return conductor 103. The field winding of motor 41 is energized through the positive main 109, conductor 134, closed switch 151—152, conductor 135, closed switch 155—156, conductor 136, through field winding 172 in the direction of arrow 174, conductor 133, closed switch 153—154, and through conductor 137 to the return lead 103. The raised front end of the car is now swung right until the key is released. When the key 74 is turned left, the current is reversed in the field winding of motor 41 as follows: positive lead 109, conductor 134, closed switch 159—160, conductor 135, closed switch 152—153, conductor 133, through field winding 172 in the direction of arrow 175, conductor 136, closed switch 157—158, and through conductor 137 to return lead 103. The armature circuit of motor 41 is closed through positive lead 109, conductor 134, closed switch 159—160, conductor 135, through the armature winding of the motor, and return conductor 103. The raised front end of the car is now swung left until the key 74 is released.

When the "Rear swing" key 75 is turned to the right, only the rear parking motor 41' is energized, and the circuits are closed as follows: positive lead 109, conductor 134 to point 134', branch wire 146, closed switch 162—163, wire 145, conductor 140, through the armature winding of motor 41', and return main 103. The field circuit is completed through positive lead 109, conductor 134 to point 134', branch wire 146, closed switch 162—163, wire 145, closed switch 166—167, wire 144, through field winding 172' in the direction of arrow 174, wire 147, closed switch 164—165, and through wire 143 to the return main 103. The raised rear end of the car is therefore swung to the right until key 75 is released. When the key is turned to the left (i. e. counterclockwise), the current in field winding 172' of motor 41' is reversed as follows: positive lead 109, conductor 134 to point 134', branch wire 146, closed switch 170—171, wire 145, closed switch 163—164, wire 147, through field winding 172' in the direction of arrow 175, wire 144, closed switch 168—169, and through wire 143 to return lead 103. The armature circuit of motor 41' is closed in the same direction as before through positive lead 109, conductor 134 to point 134', branch wire 146, closed switch 170—171, wires 145 and 140, through armature winding of motor 41', and return lead 103. As long as the key 75 is held turned to the left, the raised rear end of the car is moved sideward to the left on parking wheels 37.

Instead of using separate switch devices operated by the "Side drive" key 73, I may connect this key mechanically to keys 74 and 75, thereby dispensing with the two sets of switch contacts 113—122 and 123—132, together with the connected wiring. A mechanical driving arrangement between key 73 and the other two keys 74—75 is illustrated in Figs. 6—7. The keys or knobs 74 and 75 are fixed on rotary shafts 176—177 mounted on panel 69 and bracket 178, which may be attached to the panel. The key shafts 176—177 carry small gears 179 and 180, respectively, which are in mesh with idler gears 181 and 182 supported on bracket 178. The idler gears 181—182 are normally disconnected, so that the keys 74 and 75 can be operated independently of each other. The "Side drive" key 73 has a rotary shaft 183 which carries a gear wheel 184 arranged to be shifted into engagement with side gears 181—182. An expanding coil spring 185 on shaft 183 normally holds the latter pushed forward, so that the central gear 184 is out of mesh with the side gears 181—182, as shown in Fig. 6. A cross pin 186 on shaft 183 is held by spring 185 in an axial slot 187 of bushing 188, which may be part of the supporting bracket 178 or attached separately to panel 69.

It is clear from Fig. 6 that key 73 is normally locked against rotation, but the shaft 183 is free to be pushed in until the inner shoulder of the key strikes the panel, or until stopped in any other way. When that happens, the pin 186 is out of slot 187 and gear 184 meshes with gears 181. The "Side drive" key 73 is now geared to key shafts 176—177 in such a way that right and left handed rotation of key 73 causes simultaneous rotation of the key shafts in the same direction. In other words, the operation of key 73 turns the switch-actuating arms 150 and 161 to control the parking motors 41—41' in the manner previously set forth in detail. When key 73 is released, the tensioned coil spring 185 first rotates the shaft 183 back to initial position until the pin 186 is in alignment with slot 187, whereupon the spring pushes the shaft forward as shown in Fig. 6. The automatic return of the geared-together keys 73, 74, 75 to normal position is also effected by the spring contacts engaging the arms 150 and 161. It goes without saying that suitable stops are provided to limit the angular movements of keys 73, 74 and 75 in both directions.

In a simplified embodiment of my invention, the lifting button 70 and "Side drive" key 73, together with the connections controlled thereby, may be omitted, because it is possible to move into and out of any parking place by swinging only one end of the car. For example, to get alongside the curb from the middle of the street, the operator turns in toward the curb until the front wheels are about in the right position. Then he pushes the button 72 to raise the rear end of the car, and lastly he turns the parking key 75 to swing the rear end toward the curb. In getting out of parking position, the driver presses button 71 to raise the front end of the car, and then he turns the parking key 74 (right or left as required) to swing the front end of the car toward the middle of the street. On the other hand, it is also possible to park and unpark a car by moving the entire car sideward while it is parallel with the curb, so that only the lifting button 70 and the "Side drive" key 73 are needed.

Although I have shown and described certain specific constructions, I want it clearly understood that my invention is not limited to the details set forth. Various changes and modifications are possible within the scope of the invention as defined in the appended claims.

I claim as my invention:

1. An automobile provided with means for lifting the car off either pair of running wheels, means for swinging the raised end of the car sideward, a driving member for operating said lifting means, a separate driving member for operating said swinging means, both of said members being disconnected from the engine shaft of the car, and selectively controlled means for lifting either end of the car to the exclusion of the other.

2. An automobile carrying a unitary self-contained hydraulic structure for lifting the car, said structure being attachable to and removable from the car as a unit, and means for controlling the operation of said structure.

3. An automobile carrying at one end a unitary hydraulic structure comprising a pair of lifting cylinders and pistons, and a prime mover mounted on said structure for pumping fluid into said cylinders to raise the car off its running wheels.

4. An automobile provided with mechanism for raising at least one end off the ground, and timed means disconnected from said mechanism and operable independently thereof for automatically stopping said mechanism when the car is raised a predetermined distance.

5. An automobile provided with mechanism for raising at least one end off the ground, an electric motor for operating said mechanism, and a timed switch disconnected from said mechanism and operable independently thereof for automatically opening the motor circuit when the car has been raised a predetermined amount.

6. An automobile provided with mechanism for lifting the car and with mechanism for propelling the lifted car sideward in either direction, said mechanisms including a vertical framework arranged at one end of the car transversely thereof, an electric motor for operating said lifting mechanism, and a separate electric motor for operating said sideward-propelling mechanism, means for mounting both motors on said framework, and manually operable means for controlling said motors.

7. An automobile of standard make carrying at one end on the outside a self-contained structure for lifting the car, a source of power independent of the automobile engine and operatively connected with said structure for lowering the latter to lift the car, said structure being attachable to and removable from the car as a unit, power means carried by said unitary structure for moving the raised end of the car sideward, means for controlling the operation of said structure, said controlling means including means for automatically disconnecting said source of power when the car is supported in raised position on said structure, and controllable means whereby the car is held in raised position after the source of power is cut off.

8. An automobile provided on its instrument board with a pair of adjustable finger pieces arranged to be operated separately, mechanism controlled by one of said finger pieces for lifting only one end of the car, and mechanism controlled by the other finger piece for propelling the lifted end of the car sideward, both of said mechanisms being disconnected from the engine shaft of the car.

9. An automobile provided on its instrument board with a pair of adjustable finger pieces arranged to be operated separately, mechanism controlled by one of said finger pieces for lifting one end of the car, and mechanism controlled by the other finger piece for lifting the other end of the car, both of said mechanisms being disconnected from the engine shaft of the car and each mechanism comprising a unitary self-contained structure attached to one end of the car.

10. An automobile carrying a unitary self-contained hydraulic structure for lifting the car, said structure comprising a portion mounted rigidly on the car and a second portion movable relatively to said first portion during the lifting and lowering of the car, and a prime mover on the rigid portion of said structure for lifting the car.

11. An automobile carrying at one end a unitary hydraulic structure comprising a pair of lifting cylinders and pistons, a prime mover mounted on said structure for pumping fluid into said cylinders to raise the car off its running wheels, a pair of parking wheels on which the raised end of the car is supported, and a second prime mover mounted on said structure for operating said parking wheels to move the car sideward.

12. An automobile carrying at each end a unitary hydraulic structure comprising a pair of lifting cylinders and pistons, a prime mover mounted on each structure for pumping fluid into the associated pair of cylinders to raise the car off its running wheels, and manually controllable means for operating said prime movers simultaneously to raise the car at both ends or operating either prime mover alone to raise only one end of the car.

13. An automobile carrying a plurality of hydraulic cylinders and pistons for lifting the car, each piston dividing the associated cylinder into an upper chamber and a lower chamber, both chambers of each cylinder containing a suitable liquid, means on the car for pumping liquid from the lower to the upper chambers to raise the car, and means for returning the liquid to the lower chambers so that the car is lowered to normal position.

14. An automobile provided on its instrument board with a pair of adjustable finger pieces arranged to be operated separately, mechanism controlled by one of said finger pieces for lifting one end of the car, mechanism controlled by the other finger piece for lifting the other end of the car, a second pair of separately adjustable fingers mounted on said instrument board, and means selectively controlled by said last-mentioned finger pieces for moving either raised end of the car sideward in either direction.

15. An automobile carrying at one end a unitary hydraulic structure comprising a pair of lifting cylinders and pistons, a prime mover mounted on said structure for pumping fluid into said cylinders to raise the car off its running wheels, a pair of parking wheels on which the raised end of the car is supported, a second prime mover mounted on said structure for operating said parking wheels to move the car sideward, and manually operable means for controlling the direction of said sideward movement.

16. An automobile carrying at each end a unitary hydraulic structure comprising a pair of lifting cylinders and pistons, a prime mover mounted on each structure for pumping fluid into the associated pair of cylinders to raise the car off its running wheels, manually controllable means for operating said prime movers simultaneously to raise the car at both ends or operating either prime mover alone to raise only one end of the car, and means carried by each structure for moving the raised car sideward in either direction.

17. An automobile carrying at one end a unitary self-contained structure for lifting the car, said structure comprising a portion mounted rigidly on the car and a second portion movable relatively to said first portion during the lifting and lowering of the car, said movable portion carrying laterally arranged wheels on which the lifted car is supported for sideward movement, a prime mover on said rigid portion of the structure for lifting the car, and a prime mover on said movable portion of the structure for operating said lateral wheels in either direction.

18. An automobile provided at one end with a pair of vertical cylinders, a piston movable in each cylinder, the space in said cylinder below the piston being closed to constitute an oil reservoir, pipe connections between said reservoir and the space above the piston, an electric motor mounted between said cylinders, oil-pumping means arranged in the pipe connections of said cylinders and operated by said motor to force oil from both reservoirs into the space above the pistons, which are thereby lowered and cause the car to be raised off its usual wheels and supported by said pistons, and manually controlled means for returning the oil to said reservoirs to lower the car.

19. An automobile provided with mechanism for lifting at least one end of the car, an electric motor for operating said mechanism, a switch for controlling said motor, a movable finger piece for operating said switch, and timed means for delaying the return of the actuated finger piece to normal position until the car has been raised.

20. An automobile provided with mechanism for lifting the car off its running wheels, an operable member for controlling said mechanism to lift both ends of the car at the same time, a second operable member for controlling said mechanism to lift only the front end of the car, and a third hand-operable member to lift only the rear end of the car.

21. An automobile provided on its instrument board with a pair of adjustable finger pieces arranged to be operated separately, mechanism controlled by one of said finger pieces for lifting the car, mechanism controlled by the other finger piece for propelling the lifted car sideward, and means operated by said first-mentioned finger piece for stopping said lifting mechanism after a predetermined interval.

22. An automobile carrying at one end a unitary self-contained structure for lifting the car, said structure comprising a section mounted rigidly on the car and a second section movable relatively to said first section during the lifting and lowering of the car, an electric motor on the first section for lifting the car, and a second electric motor on the second section to propel the raised car sideward.

23. An automobile carrying at one end a unitary self-contained structure for lifting the car, said structure comprising a section mounted rigidly on the car and a second section movable relatively to said first section during the lifting and lowering of the car, a prime mover on said first section for lifting the car, and means including a second prime mover on the second section for propelling the raised end of the car sideward.

24. An automobile provided at each end with mechanism for raising the car off the running wheels, each mechanism including means for moving the raised end of the car sideward, a pair of electric motors associated with each mechanism, one motor for raising the car and the other motor for moving the raised end of the car sideward, and selectively operable means for energizing the motors of either mechanism while the motors of the other mechanism remain inactive, whereby either end of the car may be raised and moved sideward while the other end remains on the ground.

25. An automobile carrying at one end a unitary hydraulic structure comprising at least one cylinder and piston, a source of fluid supply carried by said unitary structure as a part thereof, and a prime mover mounted on said structure for pumping fluid from said supply into said cylinder to raise said end of the car.

26. An automobile carrying an hydraulic jack which comprises a stationary cylinder secured to the car, a piston reciprocable in said cylinder, a vertically movable ground-engaging part connected with said piston, spring means for normally holding said part and piston in withdrawn position, an oil reservoir, a pipe connection between said reservoir and the head of the cylinder, an electric motor near said oil reservoir, a rigid hollow framework supporting the electric motor and the oil reservoir in fixed relation to each other, said motor being housed within said framework, means operated by the motor shaft for pumping oil out of the reservoir into the cylinder head to force the piston out of the cylinder and thereby lower said part to the ground, whereby the continued pumping operation of the motor raises the car on the jack, means for holding the oil pumped into the cylinder to support the car in raised position after the motor stops, and manually operable means for releasing said oil-holding means to permit return of the oil to said reservoir and thereby lower the car, said spring means automatically retracting the piston and the ground-engaging part as the oil flows back to the reservoir.

27. An automobile carrying an hydraulic jack which comprises a stationary cylinder secured to the car, the head of said cylinder having an extension provided with a bore substantially at right angles to the cylinder axis, a piston reciprocable in said cylinder, a vertically movable ground-engaging part connected with said piston, spring means for normally holding said part and piston in withdrawn position, an oil reservoir, a pipe connection between said reservoir and said bore, an electric motor near said oil reservoir, a rigid hollow framework supporting the electric motor and the oil reservoir in fixed relation to each other, said motor being housed within said framework, means operated by the motor shaft for pumping oil out of the reservoir into the cylinder head to force the piston out of the cylinder and thereby lower said part to the ground, whereby the continued pumping operation of the motor raises the car on the jack, means for holding the oil pumped into the cylinder to support the car in raised position after the motor stops, and manually operable means for releasing said oil-holding means to permit return of the oil to said reservoir and thereby lower the car, said spring means automatically retracting the piston and the ground-engaging part as the oil flows back to the reservoir.

28. An automobile carrying an hydraulic jack which comprises a stationary cylinder secured to the car, a piston reciprocable in said cylinder, a vertically movable ground-engaging part connected with said piston, spring means for normally holding said part and piston in withdrawn position, an oil reservoir, a pipe connection between said reservoir and the head of the cylinder, an electric motor supported adjacent said reservoir for pumping oil out of the reservoir into the cylinder head to force the piston out of the cylinder and thereby lower said part to the ground, whereby the continued pumping operation of the motor raises the car on the jack, means for holding the oil pumped into the cylinder to support the car in raised position, controllable means for releasing said oil-holding means to permit return of the oil to said reservoir and thereby lower the car, said spring means automatically retracting the piston and the ground-engaging part as the oil flows back to the reservoir, and means independent of the piston head for steadying the piston in its reciprocable movements, said steadying means including a movable member connected with the piston and arranged to engage a fixed guide member outside the cylinder chamber.

ADOLPH A. THOMAS.